March 19, 1968   J. E. CORNISH   3,373,507
MNEMONIC TEACHING SYSTEM
Filed May 3, 1965
FIG. 1.
FIG. 2.
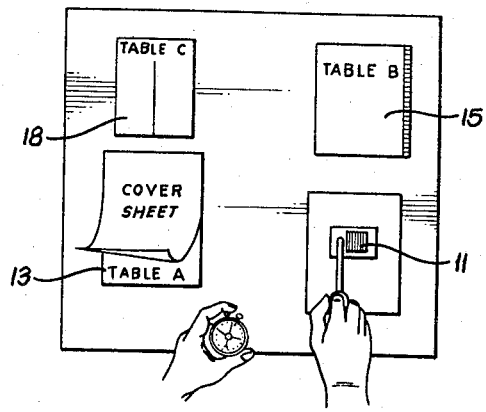
FIG. 3.
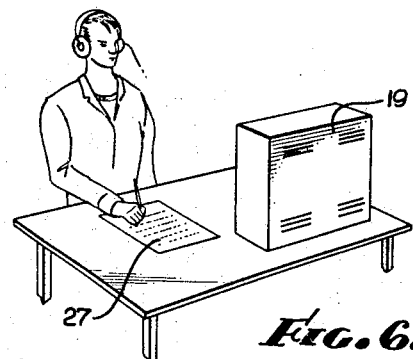
FIG. 4.
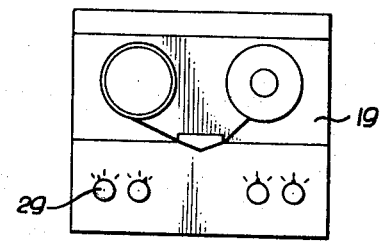
FIG. 5. FIG. 6. FIG. 7. FIG. 8.
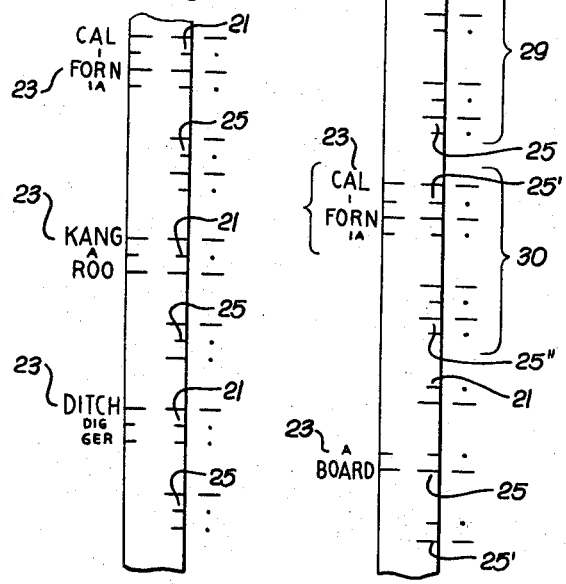
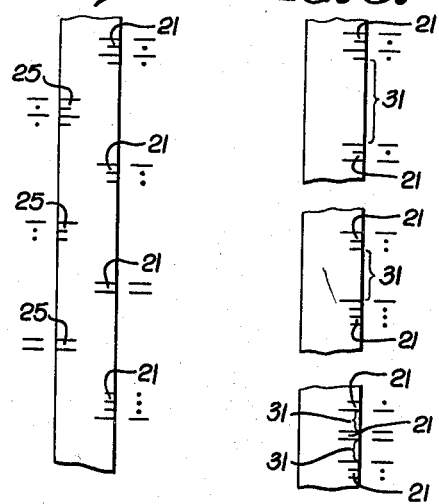
INVENTOR.
JUDSON E. CORNISH
By
Huebner & Worrel
ATTORNEYS.

United States Patent Office 3,373,507
Patented Mar. 19, 1968

3,373,507
MNEMONIC TEACHING SYSTEM
Judson E. Cornish, 405 S. Cliffwood,
Los Angeles, Calif. 90049
Filed May 3, 1965, Ser. No. 452,656
10 Claims. (Cl. 35—14)

ABSTRACT OF THE DISCLOSURE

Education, teaching code signalling through the use of mnemonic words, particularly teaching sending and receiving of Morse code symbols through the use of mnemonic words having rhythmic patterns similar to the code symbols.

---

This invention relates to a method for accelerated teaching of code signals and more particularly, the teaching of code signals which have distinctive rhythmic patterns by systematic correlation with mnemonic words or syllables having similar rhythmic patterns.

The learning of unfamiliar symbols representing particular bits of information is generally a long and tedious process. People become used to familiar processes for associating ideas with particular arrangements of symbols and do not ordinarily readily adapt to novel means of communication. The difficulty in adapting to new means of communication is particularly apparent when codes are being used which consist of a series of abstract signals that are very similar to each other. Hence, teaching a code based upon a series of dots and dashes which represent signals of varying rhythm pattern, such as used in the Morse code, can be a laborious task. And since useful sending and receiving rates for such a code often require the ability to translate or communicate hundreds of stimuli per minute, the problem of teaching the code so that it can be used proficiently becomes particularly difficult. For instance, it has been found by military code teaching schools that it often takes several hundred hours of training for an individual to be able to send and receive Morse code at the desired rate of 18 words per minute. It is apparent that such an expenditure of time is costly and desirably should be reduced. However, though a variety of different techniques have been used the amount of time required to teach Morse code has not been reduced significantly for many years.

Therefore, it is a primary object of this invention to provide a systematic means for quickly teaching a symbolic code.

It is a further object of this invention to provide a system for teaching a code utilizing mnemonic devices.

Another object of this invention is to provide a means for teaching a symbolic code by means of systematic rhythmic association with familiar words which are used as memory aids.

Still another object of this invention is to provide material for teaching the Morse code which includes lists and tape recordings of mnemonic words and phrases systematically associated with the rhythm pattern of represented code signals.

Other objects and advantages will become apparent from the following description.

The basic principle involved in this teaching method is the utilization of easily remembered mediating words and phrases as mnemonic devices. These words and phrases are selected so as to have distinctive parts which represent and correspond to the rhythmic variations in stress and duration placed upon different parts of the code they are to represent so as to create similar rhythmic patterns. Though this technique can be used for learning any symbolic communication system having distinguishable and classifiable parts, the description herein will be illustrated in detail by reference to the Morse code. The dots of the Morse code will be represented herein by short lines (e.g. -) and the dashes by lines (e.g. —) which are three times as long as the dots. There will be a single space between elements and a triple space between characters.

Proficiancy in Morse code sending and receiving requires extremely fine discriminations to be made at high speeds. Of the thirty possible arrangements of dots and dashes (using one to four syllables) twenty-six are used in the Morse code. In the code signals of the average word (Paris or - — — - - — - — - - - - - - in Morse code) there are 28 important bits of information (dots, dashes, and spaces). The differences among them are minute. For instance, - — is A but - — is ET and — - is T E but — - is N. Useful sending and receiving requires the ability to translate 500 of these bits of information per minute.

Previous methods for teaching the code never produced entirely reliable results. The results depended largely on the I.Q. of the student and on his study habits. The results of my method, however, are predictable and reliable. The range in time taken to learn the code with old methods varied from 70 hours to over 200 hours. The range in times taken to learn the Morse code using my method has been reduced to from 8 to 10 hours.

The basic feature of my method is the utilization of a mediating device to create a connection between two otherwise completely unrelated things (- — and A). People usually create mediating devices when faced with a task in rote memory. When learning the code, however, they are never able to begin with a mediating device which can be speeded up to 18 words per minute. For instance, if a mediating device goes something like this, "A is little on the top and big on the bottom so its signal is half little and half big which means either - — or — - and I remember — - is N so A must be - —," it may work well at .1 word a minute but when the code starts coming at 1 word per minute, the device must be abbreviated if the person is going to keep up. He keeps abbreviating it as long as he can, but finally it can't be abbreviated any more. At that point, the device fails completely and the student must create another mediating device. This explains why students often hit "plateaus" in trying to pick up speed when learning code.

Also, the mediator which a person develops for sending the code will probably be useless for receiving. For instance, the student hears - — and can't remember whether his "half big, half little" mediator belonged to that one or —/- or — —/- -. He probably ends up guessing until he can create a different mediator which will work better for receiving.

A mediator for sending or receiving which can be accelerated to righ rates of speed has been heretofore unknown. Therefore, previously teachers of the code have cautioned their students against the use of mediators. The students, however, must mediate their responses. (Even looking the signals up on an index is mediation.) My mediators, however, can be accelerated to 18 words per minute. Although these mediators may be unnecessary eventually the student can perform at mastery speeds long before the characters are firmly associated with the appropriate signals of the Morse code.

Morse code students taught by previous methods would always have lapses when they suddenly couldn't remember a signal they thought they had learned. (E.g., is F  - — - - or is it - - — -?) When this happened the student was helpless. However, my mediator immediately comes to his aid. He knows that F cannot be - — - - because fe de RA tion does not match that rhythm. Also, students used to have trouble keeping the signal they had just heard separate from the one they were hearing at the moment. The student using my method, though, is "hearing" words, and words are much easier to keep separate than code signals.

In addition to selecting suitable mnemonic devices a particular systematic method for employing these mnemonic devices so as to teach the corresponding symbols is utilized in this invention. The particular systematic method taught by this invention provides the means whereby an accelerated rate of learning code symbols can be achieved and hence, provides the advantages mentioned as the purpose of this invention.

In the drawings:

FIGURE 1 is a diagrammatic illustration of a student netic tape used to accelerate the receiving rate of the Morse code.

A first requirement of this invention is that the particular code symbols to be learned are analyzed in order to determine to what extent they have common distinctive classifiable characteristics. Then, mediating devices are selected which will correspond to these characteristics and provide appropriate memory aids. Applying this technique to the Morse code one first observes that the symbols are comprised of a rhythmic series of signals which are visually represented as spaced dots and dashes. The dots represent short signals and the dashes represent long signals. Each letter, number and punctuation mark represented by the Morse code is translated into one to six such spaced signals. Hence, appropriate mediating words or phrases should include the same rhythmic pattern of one to six spaced correspondingly short unstressed or long stressed portions. By selecting a word or a phrase of words having short unstressed or long stressed portions which corresponds to the particular signals desired, a suitable mnemonic can be provided. It should be noted that one critical feature of these mnemonics is that they have the same rhythm pattern as the code signal they represent though the means used may be by variations in emphasis, stress or duration of different parts of the mnemonic. The other critical aspect is that the mnemonic word or phrase be easily remembered and suggest the symbol that it represents. Accordingly, the following list of words in which the long stressed parts are capitalized and the short unstressed parts are not capitalized have been selected as suitable mnemonic devices for the corresponding Morse code dot-dash arrangement:

TABLE A.—MNEMONICS

[Memory words and phrases]
Each mnemonic has the rhythm pattern of the code signal it represents. (D=DITCH digger=— • •-).

| | | | | | |
|---|---|---|---|---|---|
| A | a BOARD | N | NEED le | 1 | u NITE ONE AND ALL |
| B | BANK ho li day | O | O RA TION | 2 | dou ble TIME PAY CHECK |
| C | CAL i FORN ia | P | phi LAN THRO py | 3 | tri pli cate TAX FORMS |
| D | DITCH dig ger | Q | QUES TION a BLY | 4 | cut it in to FOURTHS |
| E | ed | R | re BELL ion | 5 | It's fif ty fif ty |
| F | fe de RA tion | S | sy lla ble | 6 | HALF do zen peo ple |
| G | GOD FATH er | T | TRAIN | 7 | TOP SPEED se ven ty |
| H | ho no ra ble | U | un der GROUND | 8 | EIGHT BALL MEANS trou ble |
| I | ic ky | V | vi ta min PILLS | 9 | CLOUD NINE COMES RARE ly |
| J | je MI MA'S CAKES | W | wi THOUT LEAVE | 0 | O SAY CAN YOU SEE |
| K | KANG a ROO | X | XERX es the GREAT | | |
| L | le GAL i ty | Y | YEST er DAY NIGHT | . | the END the END the END |
| M | MAIL MAN -- | Z | ZO OL o gy | , | STATE MENT com ma |
| | | | | ; | STATE MENT |
| | | | | ? | is a QUES TION in it |
| | | | | / | SLANT it a FRAC tion |

1964 Cornish Education Company.

learning to send the Morse code utilizing the mnemonic devices in accordance with this invention;

FIGURE 2 is a plan view of the material and apparatus like that used by a student in FIGURE 1;

FIGURE 3 is a diagrammatic view of a student learning to receive Morse code and the apparatus used in accordance with this invention;

FIGURE 4 is a view of a tape player such as used by a student learning to receive Morse code as in FIGURE 3;

FIGURE 5 is an enlarged view of a portion of a magnetic tape used to learn to receive Morse code where representations of normally invisible track sounds are shown as edge markings positioned relative to each other substantially in accordance with this invention;

FIGURE 6 is another enlarged view of a portion of a magnetic tape used to learn to receive Morse code like FIGURE 5 where the representations of normally invisible track sounds are shown;

FIGURE 7 is still another view of a portion of a magnetic tape for repeating Morse code signals during learning of the Morse code; and FIGURE 8 is a view of fragmented portions of a mag- An analysis of this list of selected mnemonic devices reveals that each mnemonic word or phrase does have short unstressed and/or long stresed parts and a rhythm pattern which corresponds as closely as possible to the dots and dashes of the Morse code symbol it represents. Furthermore, each of the mnemonic words or phrases representing a letter begins with the letter which it represents. For instance, the Morse code symbol for the letter "A" is - — and the mnemonic selected is the word "aboard." Here, the first "a" in "aboard" is a short unstressed syllable which corresponds to the dot and the "-board" in "aboard" is a long stressed syllable which corresponds to the dash. An example of a mnemonic phrase is "bank holiday" which represents the Morse code signals — - - - for the letter "B." When "bank holiday" is spoken the word "bank" is a long stressed part of the phrase and therefore corresponds to a dash and the word "holiday" has three relatively short unstressed syllables which correspond to dots.

The phrases representing the numbers, in a like manner, are comprised of stressed and unstressed parts corresponding to the Morse code symbol for the number represented. Each of the phrases except the phrase for zero contains some form of the number represented. Since zero is often thought of as "O" a phrase using that term was believed sufficiently suggestive for utilization in this system. The phrases for each of the punctuation marks contain material which is considered to be suggested by the mark represented.

Of course, the particular words and phrases selected in this example are representative only of what are deemed suitable mnemonic devices as various other types would be adequate. However, it should be noted that any mnemonic selected must have a familiar rhythm which corresponds to the syllabic durations of the code symbol it is intended to represent.

After selecting the mnemonic devices which are deemed suitable for representing the code symbols a student, as shown in FIGURES 1 and 2, is provided with a telegraphic sender unit 11, a list of characters and selected mnemonics as in Table A 13 which represent the code signals as previously discussed and a sheet of material 15 having on it a complete list of each character to be learned arranged in random fashion in each line on the sheets in the following manner:

TABLE C

| Time taken to send a line | Words per minute | Time taken to send a line | Words per minute |
|---|---|---|---|
| 13 min | 1 wpm. | 1 m | 13 wpm. |
| 8 min. 30 sec | 1½ wpm. | 58 s | 13½ wpm. |
| 6 m. 30 s | 2 wpm. | 56 s | 14 wpm. |
| 5 m | 2½ wpm. | 54 s | 14½ wpm. |
| 4 m | 3 wpm. | 52 s | 15 wpm. |
| 3 m. 40 s | 3½ wpm. | 50 s | 15½ wpm. |
| 3 m. 20 s | 4 wpm. | 49 s | 16 wpm. |
| 3 m | 4½ wpm. | 47 s | 16½ wpm. |
| 2 m. 40 s | 5 wpm. | 46 s | 17 wpm. |
| 2 m. 20 s | 5½ wpm. | 45 s | 17½ wpm. |
| 2 m. 10 s | 6 wpm. | 43 s | 18 wpm. |
| 2 m | 6½ wpm. | 42 s | 18½ wpm. |
| 1 m. 52 s | 7 wpm. | 41 s | 19 wpm. |
| 1 m. 44 s | 7½ wpm. | 40 s | 19½ wpm. |
| 1 m. 38 s | 8 wpm. | 39 s | 20 wpm. |
| 1 m. 32 s | 8½ wpm. | 38 s | 20½ wpm. |
| 1 m. 27 s | 9 wpm. | 37 s | 21 wpm. |
| 1 m. 22 s | 9½ wpm. | 36 s | 22 wpm. |
| 1 m. 18 s | 10 wpm. | 35 s | 22½ wpm. |
| 1 m. 15 s | 10½ wpm. | 34 s | 23 wpm. |
| 1 m. 11s | 11 wpm. | 33 s | 24 wpm. |
| 1 m. 8 s | 11½ wpm. | 32 s | 24½ wpm. |
| 1 m. 5 s | 12 wpm. | 31 s | 25 wpm. |
| 1 m. 3 s | 12½ wpm. | | |

TABLE B

QJWCRDK. AFSGBN? P L4, E OX15 V UIY3ZT HM 98 6 72 /0

DH91ZA ? NGC IK47QO, MFU .SO8L5 P36 BW J X ET YR V 2 /

VIJUL C 8. M FIAGTX B3QORHE9 YNKD6Z2W ? P / 5 , 4 S 07

By using the previously described material in accordance with this invention a student can quickly learn to send Morse code. The student learns to translate these characters into the proper code signal by means of repeated association with the mnemonic word or phrase of words which have the same rhythmic pattern of stressed and unstressed parts of the code signal such as shown by Table A. The suggestive meaning of the mnemonic phrase or word enables the student to remember the associated character as previously discussed.

In order to communicate by code a reasonably practical comprehension speed must be developed by the senders and receivers of the code. Hence, it has been found that a particular systematic method for utilizing the mnemonic devices as hereinbefore described enables a learner to rapidly increase his rate of sending the code. A Morse code telegrapher should be able to send and receive at the rate of eighteen words per minute in order to meet the usual requirements for the military services, for example.

Tests have been made of typical students' learning rates when first exposed to the Morse code until they can send and receive the code at the rate of eighteen words per minute. Methods used prior to this mnemonic teaching system often required several hunderd hours of concentrated training in order to learn to send and to receive the Morse code at the rate of eighteen words per minute. By using this mnemonic system the time required to learn Morse code at the rate of eighteen words per minute has been reduced, on the average, to two hours of training to learn to send and eight hours of training to learn to receive.

For instance, a person totally unfamiliar with the Morse code takes about seven minutes to send one line of all forty random characters such as shown in Table B. This is roughly sending at the rate of four words per minute. Of course, when sending a code for the first time the student has to look up the code signals for each character. By noting the time that it takes him to send a line of scrambled characters as in Table B the student can translate his performance into words per minute by reference to the following conversion table:

When using a sheet of randomly arranged characters as in Table B and a code sheet having mnemonic words and phrases as in Table A, a student seated at a table, as in FIGURE 1, is instructed to recall and send on the telegraphic sender 11, as shown in FIGURE 2, as much of the code as he can remember from the list of scrambled characters in Table B and only refer to the covered Table A Mnemonics Index 13 when necessary. In order to induce the student to refer only to the Mnemonics Index when absolutely necessary he is instructed to lift the cover sheet with the same hand he used for sending. As he learns the Morse code better, fewer and fewer references to the code sheet become necessary as the student sends each line of the scrambled characters. Instead of the lines of random characters on a sheet 15 as shown in Table B the characters can be exposed to the student by means of randomly selected cards or by other suitable means. However, if using a sheet 15 such as Table B it is convenient to provide a space at the end of each line to put the rate of words per minute by conversion of the time taken to send the line, noted by reference to stop watch 16, in accordance with sheet 18 which is Table C.

Though, of course, the learning of the code symbols in order to send the code signals is related to comprehension of the signals when received, it has been found that there is not an automatic transfer of code learning from sending to receiving. Hence, it is necessary to use a special system to teach students to receive and translate code signals at a reasonably rapid rate such as the eighteen words per minute commonly required in military Morse code communication. In order to closely approximate the actual signals to be received, mnemonics such as previously described are transmitted to the student through the same sensory media as the student is expected to receive the signals when on the job. That is, if the signal is audible, as in a telegraph message, then the mnemonic teaching system should be audible. On the other hand, if some other sensory signal is to be used, such as blinking flashes of light, then the mnemonic teaching system should be visual.

As a general illustration of a mnemonic system for teaching the translation of audible code signals in accordance with this invention a mnemonic word or phrase is synchronized exactly with the rhythm pattern of the signal representing the corresponding character. Then the signal is repeated without a synchronized mnemonic device. A random utterance of all the characters to be learned is made and then continually repeated until a student is able to recognize all forty mnemonics by their rhythm alone. A variety of devices can be used to utter the signals in accordance with this invention. However, the description will be primarily limited to the preferred method used.

This synchronization of the code rhythm pattern with the corresponding mnemonic word or phrase of words can be satisfactorily achieved, by way of example, through the utilization of a two-track stereophonic tape player 19 as shown in FIGURES 3 and 4. A tape recording is made for use on such a tape player by rhythmically uttering a scrambled series of each of the code signals for all the characters followed by at least one repetition of each code signal on one track, hereinafter called the code track, and then making a series of the mnemonic devices for each of these code signals rhythmically uttered in synchronization exactly with the rhythm pattern of the first utterance of each different code signal on the code track, said synchronized track hereinafter being called the mnemonic track. The replaying of such a tape will produce a scrambled series of repeated utterances of each of the code signals. The first utterance of each code signal will be synchronized with the corresponding rhythmic stress pattern of a selected mnemonic device. The repetition of the code signal immediately after this synchronized utterance will be a clear sound such as would be heard during normal telegraphic code communication. Examples representing a portion of such a synchronized tape with the sound track illustrated by visual marks on the edges are shown in FIGURES 5 and 6 (though normally the track marks are invisible). The sound marks on one side of such a tape represent the code track 21 and the marks on the other side represent the mnemonic track 23.

During use generally of such a synchronized tape to teach a student who is familiar with the mnemonic devices the sounds of the corresponding code signals the student can gradually reduce the volume of the mnemonic track 23 as he is learning to recognize the mnemonic by its rhythm (signal). He turns down the volume until the mnemonics are at threshold volume (the volume below which the mnemonics are no longer intelligible and yet are still necessary for the student to recognize the signals).

When the student reaches threshold he is given another tape recording to listen to as illustrated in FIGURE 6. This recording is made by playing the signals again in scrambled order but playing each one four times and by uttering the mnemonic at threshold volume in unison with the third signal. This gives the student two chances to recognize the mnemonic in the code signal 29 before hearing the mnemonic played. His attempts are either confirmed or corrected by the following mnemonic. He will then be able to make the correct response when he hears the played mnemonic "echoed" by the code signal 30. The number of mnemonics the typical student is able to recognize prior to the played mnemonic goes up steadily in accordance with the number of lines to which he listens. When he is able to correctly receive and translate all of the signals of the particular code into their corresponding characters before the played mnemonic, he has learned to receive the code.

However, as noted previously, the normal requirements for a person who is to receive and translate Morse code is not merely that he be able to receive code, but that a particular rate of code translation be proficiently received. While learning to receive the code by means of a tape recording as previously described the student's rate of receipt is one quater of the normal desirable rate simply because he hears each signal four times although each signal is played at the predetermined desirable rate. However, when the student is receiving the characters before hearing the played mnemonic, he is responding in only twice the time necessary for the desirable rate, rather than four times that time. The next step in this teaching system is to eliminate the repeat and require the student to respond at the desirable rate. This is done as illustrated in FIGURE 7 by making a tape recording with each signal played once on one track of the tape and repeated on the other track. The student can then gradually reduce the volume of the repeat until it disappears. The final step is, of course, to remove the unusual gap between characters which is left by the disappearance of the repeat. This can be achieved by utilizing equipment especially designed for this purpose or by preparing a tape of the code signals 21 without repetitions as in FIGURE 8. The signals on such a tape are uttered at a predetermined rate of receipt and with time gaps between each of the code signals toward the end of the tape that would be normal during actual receipt of such code signals.

To learn sending as a preferred example of this invention the student is given materials as shown in FIGURE 2 and instructions as follows:

The Index of Mnemonics 13 (words that aid the memory as in Table A) will enable you to remember the code signals easily, because the character will make you think of the mnemonic and the mnemonic has the rhythm of the code signal. So, to send a character in code, send the rhythm of its mnemonic.

As a first step using the Mnemonic Index 13 as in Table A, send the rhythm of each mnemonic with the code key 11, going down the list in order. Repeat until you can send the signals without hesitation.

The second step is to use the sheet of Scrambled Characters 15 as in Table B, and send the code signals for the characters in the lines of Scrambled Characters as fast as you can. Refer to the Mnemonics Index 13 whenever necessary. Time yourself with the stopwatch 16. Write down your sending rate in words per minute at the end of each line 18 of Table B using the Conversion Table 16 illustrated as Table C. Continue sending until you can send 13 words per minute.

As an explanation of this system, the particular mnemonics used in this process are only a sample of the many words and phrases that would be suitable mediating devices for the Morse code. To be suitable a mnemonic must have a familiar rhythm which corresponds to the rhythm of the code signal it is intended to represent and must in some way be suggested by the character.

The rhythm of the mnemonic refers to the pattern of the stressed or long and unstressed or short syllables. The stressed or long syllables correpond to the dahes of the More code. The other syllables correspond to the dots. (The rhythm may be determined by differences in amplitude, intonation, duration, pitch and spacing of the syllables.)

The character can be suggested by the mnemonic by beginning the mnemonic with the character (e.g. Aboard for A), by containing its name (e.g. "statement comma statement" for comma), by containing a form of its name (e.g. "triplicate tax forms" for three), by containing a homonym or visual form of the character (e.g. "O' say can you see" for zero), by containing a synonym for its name (e.g. "half-dozen people" for six), or by including any other property commonly associated with the character.

A summary of the materials used in this example is as follows: (1) In the Mnemonic Index 13 are listed the characters to be learned in alphabetical and numerical order (for easy reference) wherein the mnemonic for each corresponds with the rhythm pattern indicated by the appearance of the mnemonic. (2) Any code key 11 or other device may be used for making a code signal. (3) Each character appears once in each line in random order as in Table B so that the discriminations among all the signals are brought to strength together. (4) A stopwatch 16 or other device is used for accurate timing. (5) A space on Table B is provided to write sending speed at the end of each line of scrambled characters. (6) The Conversion Table 18 gives times (in minutes and seconds) taken to send a line of scrambled characters and their equivalent in words per minute. (This was calculated by using "Paris" as the average word and considering Paris to be equal to 49 element lengths, including dots, dashes, spaces between elements and characters and including one word space. A dot is an element length. A dash is equal to three dots. An element space is equal to one dot. A character space is equal to three dots. A word space is equal to seven dots. Total element lengths in one line divided by 49 equals 13 words and the words per minute are calculated according to how many seconds it takes to send these 13 words.)

To learn receiving as a preferred example of this invention the student is given materials as shown in FIGURES 3, 4, 5, 6, 7 and 8 and instructions generally as follows: The tapes in FIGURES 5, 6, 7 and 8 will enable you to recognize the mnemonic from only its rhythm as given in the code signal just as you can "hear" the lyrics of a song when only its tune is played. So, to receive a character in code, recognize the rhythm of its mnemonic.

In the first step, the Induction Tape in FIGURE 5 is used. On this tape you will hear the mnemonic 23 in unison with the code signal for the character 21 followed by a repeat of the code signal 25. The mnemonic and the repeated code signal sound similar because the mnemonic is distorted (played at double speed) and is masked by the synchronized code signal. Since the code signal sounds so much like the mnemonic which it immediately follows it sounds like an echo of the mnemonic. You can heighten this echo effect by lowering the volume of the mnemonic. After you have listened for the echo of the mnemonic in the following code signal, write the character on a receiving sheet 27. After each line turn down the volume of the mnemonic as much as possible without missing any of the characters. Continue until you reach the threshold volume which is the point below which you cannot lower it further and still hear the mnemonics.

The second step is to use the Recognition Tape in FIGURE 6. On this tape you will hear a repeated code signal 29 followed by the echo device (synchronized mnemonic followed by code signal 30). You will begin to recognize some of the mnemonics by their rhythm in the repeated code signals. You will then either confirm or correct your response with the echo device. The repeated code signal 29 is a code signal 21 followed by a repeat 25 and the echo device 30 is a repeat 25' of the previous code signal 21 synchronized with a mnemonic 23 and followed by another repeat 25" of the code signal 21. If you recognize the mnemonic in the repeated code signals, write the character and put a check above it on the receiving sheet 27. If you don't recognize the mnemonic, listen to the echo device 30 and then write the character without a check. Write the number of characters checked at the end of each line on the receiving sheet 27. Continue until you are able to check all the characters.

The Repetition Tape in FIGURE 7 is used during the third step of this process. On this tape you will only hear the repeated code signal 21 for each character. Your response to the first signal 21 will be strengthened when you match it with its repeated signal 25 which, in this case, is on the other track of the tape. Write the character as soon as possible. After each line turn down the volume of the repeat 25 as much as possible without missing any of the characters. Continue turning down the volume until the repeat is gone.

In the fourth step, the Acceleration Tape in FIGURE 8 is used. In this tape the gaps 31 between the signals 21 are gradually decreased toward the end as indicated by the fragments taken from top to bottom of the tape in FIGURE 8. On this tape you will accelerate your response as the gaps 31 between the signals 21 are gradually eliminated. This simply means that you will have to write a little faster on each line. Write the character as soon as possible. Continue until the end of the tape at which time you will be receiving at the rate of 18 words per minute.

Specifications for receiving materials as previously described are as follows:

The tapes used for receiving are stereo magnetic recording tapes with two tracks so that the student can have differential control over the two aspects of the Induction Tape in FIGURE 5 and the Repetition Tape in FIGURE 7. The results would probably be almost as good using one track monaural tapes with the volume of one of the aspects decreasing in steps determined by the typical student's needs. On the tapes each signal 21 (with or without repeats 25) appears once randomly in each group. The speed at which the code signals are played is 18 words per minute. (Of course, if there is a repeat 25 of a signal 21, the student only writes down half as many different signals in a minute as he would on a normal tape of code played at 18 words per minute, etc.) The mnemonic 23 is heard at double the speed it was recorded (to distort speech sounds and emphasize rhythm which is unchanged by speed).

Each signal 21 on the Induction Tape in FIGURE 5 has one repeat 25 and the mnemonic 23 is spoken in unison with the first signal. The student has control of the volume of the mnemonic 23. The receiving sheets 27 are divided so that on each line there is room to write each character in a scrambled group to check the characters received ahead of the mnemonics, and to write the total of checked characters. On the Recognition Tape in FIGURE 6 each signal 21 has four repeats and the mnemonic is uttered at threshold volume in unison with the third signal. The Repetition Tape in FIGURE 7 has signals 21 which are repeated only once and the mnemonic is not heard at all. The student has control over the volume of the repeat 25. On the Acceleration Tape in FIGURE 8, the spaces 31 left between signals by the disappearance of the repeat become shorter and shorter until normal spacing for 18 words per minute is reached towards the end of the tape. This diminishing of space 31 is graphically illustrated in FIGURE 8 by comparison of the longer space 31 in the upper fragments of the tape to the lower fragments.

That a student will rapidly learn to send the Morse code by using this method is evidenced by the following chart of a typical student's performance:

SENDING CHART

| Number of times through the code: | Sending rate in words per minute |
|---|---|
| 1 | 4.3 |
| 2 | 5 |
| 3 | 5.2 |
| 4 | 5.9 |
| 5 | 6.3 |
| 6 | 6.5 |
| 7 | 6.6 |
| 8 | 6.7 |
| 9 | 6.8 |
| 10 | 7.2 |
| 11 | 7.7 |
| 12 | 7.8 |
| 13 | 7.9 |
| 14 | 8.0 |
| 15 | 8.1 |
| 16 | 8.6 |
| 17 | 9.2 |
| 18 | 9.9 |
| 19 | 10.5 |
| 20 | 11.5 |
| 21 | 11.5 |
| 22 | 12.5 |
| 23 | 13 |

In a like manner a typical student will rapidly learn to receive Morse code as evidenced by the following chart:

RECEIVING CHART

| Number of lines of scrambled characters received | Volume of mnemonic | |
|---|---|---|
| 1 | Full | Induction Tape. |
| 5 | | |
| 10 | | |
| 15 | | |
| 20 | | |
| 25 | Threshold | |
| 30 | | |
| | Number of characters recognized before mnemonic is played | |
| 31 | 5 | Recognition Tape. |
| 35 | 10 | |
| 40 | 15 | |
| 45 | 20 | |
| 50 | 25 | |
| 55 | 30 | |
| 60 | 33 | |
| 65 | 35 | |
| 70 | 38 | |
| 75 | 39 | |
| 80 | 40 | |
| | Volume of repeat | |
| 81 | Full | Repetition Tape. |
| 85 | | |
| 90 | | |
| 95 | | |
| 100 | | |
| 105 | | |
| 110 | | |
| 115 | | |
| 120 | Zero | |
| | Size of gaps between signals | |
| 121 | Double normal | Acceleration Tape. |
| 125 | 1¾ normal | |
| 130 | | |
| 135 | | |
| 140 | 1½ normal | |
| 145 | | |
| 150 | Normal for 18 words per minute. | |

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims so as to embrace any and all equivalent devices.

What is claimed is:

1. The method of teaching the Morse code comprising the utterance of each of the code symbols representing characters of the code in scrambled order followed by at least one immediate repetition of each uttered code symbol, simultaneously rhythmically uttering a mnemonic distinctly representing each character at the same time as at least one utterance of the code symbol, said mnemonic corresponding to the rhythmic pattern of the code symbol with which it is simultaneously uttered, gradually reducing the volume of the utterance of the mnemonics until they are inaudible, eliminating utterances of the repetitions of the code symbols, and uttering said unrepeated code symbols at a predetermined increasing rate of speed.

2. The method of teaching a code system comprising repeated uttering of code symbols representing each character, each said code symbol having a distinctive rhythmic pattern, simultaneously uttering a mnemonic device distinctively representing each character at the same time as at least one utterance of the code symbol, said mnemonic device corresponding to the rhythm pattern of the code symbol with which it is simultaneously uttered, gradually reducing the utterances of the mnemonics until they are imperceptible, eliminating utterances of repetitions of the code symbol, and uttering said unrepeated code symbols at a predetermined increasing rate of speed.

3. The method of teaching a code system comprising repeated uttering of code symbols representing each character, each said code symbol having a distinctive rhythmic pattern and simultaneously uttering a mnemonic device representing each character at the same time as at least one utterance of the code signal, said mnemonic device audibly corresponding to the rhythmic pattern of the code signal with which it is simultaneously uttered and being suggested thereby.

4. Apparatus for teaching the Morse code including a two-track stereophonic magnetic tape recording having a code track and a mnemonic track, at least one complete scrambled series of each of the Morse code symbols followed by at least one immediate repetition of each of said Morse code symbols on said code track of the tape and a series of mnemonics corresponding to each of the characters represented by the Morse code symbols on said mnemonic track of the tape, said mnemonic devices each having the same rhythm pattern as the represented Morse code symbol and being arranged on said mnemonic track of the tape in such a manner that when said tape is played the mnemonic device corresponding to the code symbols is uttered simultaneously with at least one utterance of each code symbol in the series so that the rhythm patterns of said mnemonic and simultaneously uttered code symbol coincide.

5. Apparatus for teaching the Morse code as defined in claim 4 in combination with an audio playing instrument which is capable of playing two-track tape recordings and which includes separate volume controls for each track of a two-track tape.

6. Apparatus for teaching the Morse code as defined in claim 5 including at least one tape recording of unrepeated Morse code signals.

7. A Morse code teaching system comprising, in combination, a complete set of characters to be coded, a list of Morse code signals having rhythmic short and long portions that correspond to each of said characters, a set of mnemonics representing each of said characters, said mnemonics consisting of words and phrases having short and long portions corresponding to similar portions of the Morse code signal of the represented character, a two-track tape recording having at least one complete scrambled set of each of the Morse code signals followed by an immediate repetition of each Morse code signal on a code track of the tape and a set of said mnemonics corresponding to each of the characters represented by the Morse code signals on a mnemonic track of the tape, said mnemonics being arranged on said mnemonic track of the tape in such a manner that when said tape is played the mnemonics are uttered simultaneously with at least one utterance of the corresponding Morse code signal so that the rhythmic patterns of said mnemonics and simultaneously uttered Morse code signal coincide, and an audio two-track tape playing instrument which includes separate volume controls for each track of a two-track tape.

8. A Morse code teaching system as defined in claim 7 which includes a tape recording of a set of unrepeated Morse code signals.

9. A Morse code teaching system as defined in claim 7 which includes a second two-track tape recording having a set of Morse code signals followed by three immediate repetitions of each Morse code signal on one track and the corresponding mnemonic synchronized with the third repetition of each code symbol on the other track, a third tape having one immediate repetition of each Morse code signal and a fourth tape having a set of Morse code signals without immediate repetitions of each symbol wherein the utterance of the Morse code signals are spaced progressively closer together toward the end of said tape.

10. A method for teaching a symbolic code comprised of a series of short and long signals comprising the steps of:

(a) selecting a mnemonic having distinctive short and long parts corresponding to similar parts of each code symbol;

(b) synchronizing sensory stimulating transmissions of the mnemonic with each code symbol represented thereby;

(c) repeating the code symbol after each synchronized transmissions of the mnemonic device and the code symbol represented thereby;

(d) gradually deleting the transmission of each mnemonic device; and (e) deleting the repeated code symbol and its corresponding time gap between each of the remaining code symbols.

References Cited

UNITED STATES PATENTS

| | | | |
|---|---|---|---|
| 1,435,660 | 11/1922 | Rogerson | 35—1 |
| 1,521,566 | 12/1924 | Snyder | 283—1 |
| 1,525,342 | 2/1925 | Van Order | 35—14 |
| 2,300,038 | 10/1942 | Wright | 35—14 |
| 2,425,122 | 8/1947 | Petty et al. | 35—14 X |
| 2,777,901 | 1/1957 | Dostert | 35—35 X |

EUGENE R. CAPOZIO, *Primary Examiner.*

H. S. SKOGQUIST, *Assistant Examiner.*